United States Patent
Carroll et al.

(10) Patent No.: US 8,050,141 B1
(45) Date of Patent: Nov. 1, 2011

(54) DIRECTION FINDER FOR INCOMING GUNFIRE

(75) Inventors: Thomas L. Carroll, Alexandria, VA (US); Graham K. Hubler, Highland, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 539 days.

(21) Appl. No.: 12/275,355

(22) Filed: Nov. 21, 2008

Related U.S. Application Data

(60) Provisional application No. 61/021,060, filed on Jan. 15, 2008.

(51) Int. Cl.
*G01S 3/802* (2006.01)
(52) U.S. Cl. .......................... 367/124; 367/906
(58) Field of Classification Search ................. 367/124, 367/129, 906
See application file for complete search history.

(56) References Cited

U.S. PATENT DOCUMENTS

| | | | | |
|---|---|---|---|---|
| 5,241,518 A | * | 8/1993 | McNelis et al. | 367/127 |
| 5,504,717 A | * | 4/1996 | Sharkey et al. | 367/124 |
| 5,973,998 A | * | 10/1999 | Showen et al. | 367/124 |
| 6,192,134 B1 | * | 2/2001 | White et al. | 367/129 |
| 6,847,587 B2 | * | 1/2005 | Patterson et al. | 367/906 |
| 7,139,222 B1 | * | 11/2006 | Baxter et al. | 367/129 |
| 7,433,266 B2 | * | 10/2008 | Ledeczi et al. | 367/129 |
| 7,710,828 B2 | * | 5/2010 | Barger et al. | 367/127 |
| 2010/0226210 A1 | * | 9/2010 | Kordis et al. | 367/127 |

OTHER PUBLICATIONS

A. Donzier et al., "Gunshot Acoustic Signature Specific Features and False Alarms Reduction," in Sensors and C3I Technologies for Homeland Security and Homeland Defense IV, Proc. of the SPIE, vol. 5778 (2005) pp. 254-263.
A. Fenwick, "Algorithms for position fixing using pulse arrival times," IEE Proceedings on Radar, Sonar, and Navigation, vol. 146, No. 4, p. 208-212 (1999).

* cited by examiner

*Primary Examiner* — Ian Lobo
(74) *Attorney, Agent, or Firm* — Amy Ressing; Joslyn Barritt

(57) ABSTRACT

A system and method is provided for estimating a trajectory of an incoming bullet based on the acoustics of the shock wave created as the bullet travels through the air. A first auditory signal representing a direct sound from the shock wave is recorded and its azimuthal direction is determined. Based on this azimuthal direction and other assumptions two possible bullet directions that can cause that shock wave are estimated. A second auditory signal representing a reflection of the shock wave as it travels through the air also is recorded and its azimuthal direction determined. The azimuthal direction of the ground reflection will lie between the azimuthal direction of the first auditory signal and the more correct of the two estimated trajectories, and thus can resolve the ambiguity in the estimated direction of the bullet source.

20 Claims, 12 Drawing Sheets

DIRECTION FINDER FOR INCOMING GUNFIRE

CROSS REFERENCE

This application is based on and claims priority from U.S. Provisional Application No. 61/021,060 filed Jan. 15, 2008, the entirety of which is hereby incorporated by reference into the present disclosure.

TECHNICAL FIELD

The present invention relates to ballistic acoustics and its use in estimating the direction of incoming gunfire.

BACKGROUND

Modern warfare poses many risks to the men and women in war zones, including the men and women in the United States Marine Corps. One problem that Marines have in many conflicts is with untrained insurgents shooting at them from short range with assault rifles. These shooters are not trained snipers, but just lone individuals taking potshots at the Marines. Reacting to these shots can require the use of a Marine's time and resources that may better be used elsewhere. More significantly, often these shots hit their targets, injuring or even killing Marines in the line of fire. In many cases, the Marines cannot effectively respond to the shots or capture the shooter because they cannot accurately determine the direction from which the rifle was fired.

Often these shots come from assault rifles firing supersonic bullets. When a bullet is fired from a gun at supersonic speeds, the gunshot creates two sources of sound. The first sound is carried by an acoustic shock wave, akin to a small "sonic boom," that is created by the bullet as it travels through the air at supersonic speeds. The second sound is the muzzle blast caused by the explosion of superheated gases from the muzzle of the gun.

Because the acoustic shock wave is caused by the bullet as it travels at supersonic speed, the first sound heard by a Marine in the area is caused by the acoustic shock wave, which travels outward in a cone from the bullet's trajectory. However, this shock wave does not come from the direction in which the bullet was fired but instead comes at an angle from that direction, and therefore the shock wave can't reliably be used to determine the source of the gunfire. In addition, although a gunshot will produce a shock wave as it travels through the air which can be perceived by a nearby Marine, the same perceived shock wave can also be produced by a gunshot traveling in a second direction. This ambiguity in direction cannot be resolved using only the direct sound from the shock wave.

The Marine may also hear the muzzle blast a short time after hearing the shock wave. Under conditions the muzzle blast can be used along with the shock wave to locate the shooter. However, the sound from the shock wave can be loud enough to reduce the hearing sensitivity of Marines within earshot for a short time, and so a Marine may not hear the muzzle blast. In addition, at longer ranges, many echoes of the muzzle blast are produced in an urban environment, making it impossible to decipher the muzzle blast direction. Moreover, if the Marine does not have a direct line of sight to the shooter, he may not hear the muzzle blast at all, even if his hearing sensitivity is not reduced by the shock wave.

Because of these shortcomings in a Marine's ability to determine the direction of incoming gunfire by simple auditory sensing, many developers are working on acoustic sniper detectors. Most of these detectors use arrays of sensors to detect both the shock wave and the muzzle blast and can give a very precise location for the sniper. In current use, these sensors are placed on poles, for example for ground- or vehicle-mounted sensor arrays, or are placed in arrays mounted on a Marine's helmet. However, none of these existing systems are compact enough to be carried by a single Marine without networking.

For example, in existing systems, achievement of high precision in determining the location of a shooter requires that the sensors be spread out over a large area. This can be achieved in many ways.

One current system is the Boomerang system produced by BBN Technologies of Cambridge, Mass. The Boomerang system comprises a vehicle-mounted array of microphones to detect incoming fire. However, the Boomerang system requires a computer such as a small desktop computer, and can take some time to respond, during which time many additional shots can be fired, posing additional risks to nearby Marines.

Other systems, such as ShotSpotter® system deployed in some locations use sensors mounted in multiple arrays connected by a wireless network between sensors mounted in multiple places. Such wireless networks can create problems with communications security and interference, and in the case of helmet-mounted sensors, can increase the risk to the Marines, with each Marine becoming a radio beacon broadcasting his location to anyone listening.

Thus, none of the existing sniper detection systems have proven to be satisfactory.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a system and method for estimating a direction of incoming gunfire based on acoustic properties of the shock wave cone created by a supersonic bullet as it travels through the air. If only the direct sound produced by the shock wave cone is analyzed, an ambiguity results because two different trajectories can produce the same perceived acoustic shock wave. The system and method of the present invention resolves this ambiguity. The present invention uses the fact that in addition to the sound produced directly by the shock wave as it travels past a sensor there are reflected sounds, such as the ground reflection sound that results from the shock wave being reflected off the ground before being received.

In accordance with the present invention, a first auditory signal representing a direct sound from the shock wave is recorded and its azimuth and altitude directions are determined. Based on these directions and other assumptions regarding, for example, the velocity of the bullet and the distance and elevation of the shooter, two possible bullet trajectory directions that can cause that shock wave are estimated. A second auditory signal representing, for example, the ground reflection of the shock wave as it travels through the air also is recorded and its azimuth and altitude directions are determined. The azimuthal direction of the ground reflection will be closer to one of the two possible bullet trajectory directions previously estimated based on the direct sound, and thus an orientation of the shock wave cone can be determined. Because the bullet trajectory creates a unique shock wave cone, sampling both the direct and reflected sounds gives two points on this cone, allowing for an unambiguous determination of its orientation. When the orientation of the shock wave cone is combined with an assumption on the bullet velocity, the bullet trajectory can be fully determined.

A detector for use in the method of the invention can comprise three or more microphones, shock wave sensors, or any other device sensitive to the acoustic shock wave. The sensors can be placed in any one of many different locations, such as on equipment worn by a Marine or as part of equipment mounted on a vehicle or structure. The directions can be estimated using software loaded on, for example, a small handheld computer or other portable device that can easily be used by Marines in the field. The system can be configured to provide an auditory signal to the Marines regarding the direction of the gunfire. Exact precision in the direction of the incoming shots is not necessarily provided by this method nor is it required. What is provided is merely is a general direction so that the Marines can take steps to remove or nullify the threat.

DETAILED DESCRIPTION

Figure 1:
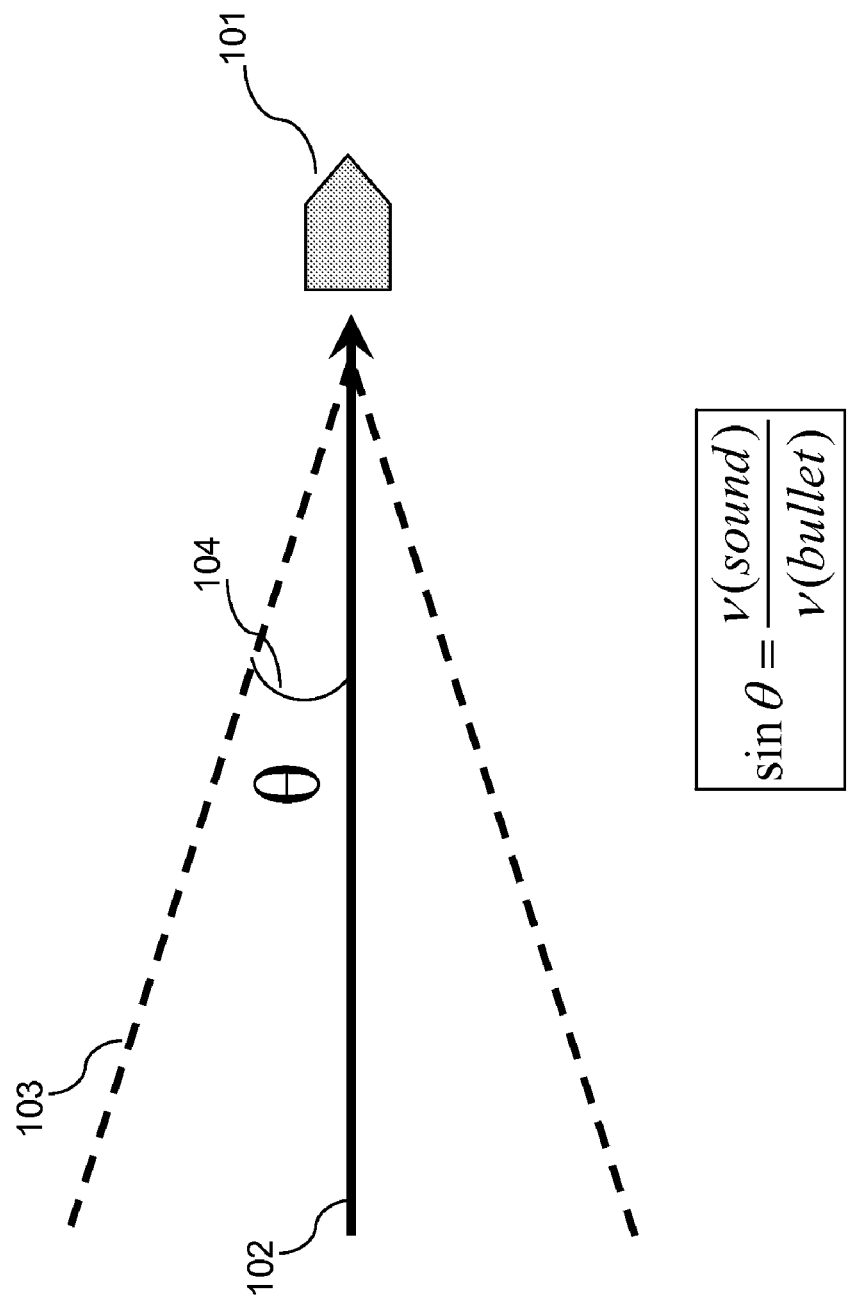
FIG. 1 is a block diagram illustrating the manner in which a bullet traveling along a trajectory creates a shock wave having a particular angle θ.

The aspects and features of the present invention summarized above can be embodied in various forms. The following description shows, by way of illustration, combinations and configurations in which aspects and features of the invention can be put into practice. It is understood that the described aspects, features, and/or embodiments are merely examples, and that one skilled in the art may utilize other aspects, features, and/or embodiments or make structural and functional modifications without departing from the scope of the present disclosure.

For example, although the invention is often described below in the context of an embodiment comprising devices that can be incorporated into equipment worn or carried by a Marine, it can readily be appreciated that other configurations also are possible, including embodiments comprising devices mounted on a vehicle or on a stationary sensor. All such embodiments are within the scope and coverage of the present disclosure.

As noted above, Marines often cannot capture a shooter firing upon them from a distance because they cannot accurately determine the direction from which the rifle was fired. The present invention provides a very simple method that uses sensors that can be incorporated into equipment worn by an individual Marine and which can provide the Marine information regarding an approximate direction of the shooter. In addition, in some embodiments, the system can provide an immediate audible indication of the direction of incoming fire so that a response to the shot can be formulated more quickly. The system can be configured to shut off after the first shot is heard, so that it will not be confused during a firefight.

The present invention uses characteristics of the acoustic shock wave created as a bullet travels through the air at supersonic speeds. The shock wave travels with the bullet, at any point along the bullet's trajectory it will pass relatively close to a detector. This makes the multipath (echo) problem simpler than for the muzzle blast, which originates close to the gun and thus relatively far away from the detector. The shock wave is also very loud, roughly comparable to a firecracker, and of short duration, so it is easy to recognize when sensed by a detector. The science of recognizing gunshots is well developed, see, e.g., A. Donzier et al., "Gunshot Acoustic Signature Specific Features and False Alarms Reduction," in *Sensors and C3I Technologies for Homeland Security and Homeland Defense IV, Proc. of the SPIE*, Vol. 5778 (2005) p. 254, and any technique known in the art for recognizing and eliminating false signals can be used to isolate the sound produced by the shock wave from other signals received by the sensors. For example, it is known in the art that the power spectrum of the shock wave contains many more high frequencies than does the muzzle blast, and this can be used to identify the shock wave and distinguish it from other sounds.

The speed of sound at sea level is approximately 340 meters/second. The velocity of the bullet is not known, but the range of possible velocities can be narrowed down. For purposes of the present disclosure, it can be estimated that the shots came from assault rifles at a range of 100-200 meters, and that the bullet speeds were approximately 500 to 850 meters/second. These estimates are consistent with the experiences of Marines with this type of gunfire and with measured bullet velocities for such assault rifles at those ranges.

FIG. 1 shows a diagram of a shock wave 103 created from the trajectory 102 of bullet 101 traveling through the air at supersonic speeds. This shock wave forms a cone of air around the bullet's trajectory. The shape of the cone is defined by an angle θ, which in turn is determined by the bullet's speed according to the formula:

$$\sin\theta = \frac{v(\text{sound})}{v(\text{bullet})}$$

Based on the bullet speed of 500-850 meters/second and the sound speed of 340 meters/second described above, it can be initially estimated that a bullet will create a shock wave cone having an angle θ of between 23 and 41 degrees. In the method of the invention, a reference angle can be chosen that lies between these two estimates. In an exemplary embodiment described herein, the reference angle is chosen to lie directly between the two estimates. Thus, in an exemplary embodiment described herein the shock wave is initially assumed to be traveling with an angle of 32 degrees. This assumption is used in some of the additional estimates according to the method of the present invention. Of course, as will be seen with respect to some of the experimental examples described below, the method of the invention does not rely on the particular estimated angle, and other estimates of the shock wave angle also can be used equally well.

Another assumption is that the bullet trajectory is roughly parallel to the ground, which is true unless the sniper is firing from a tall building or a steep hilltop. This assumption is made only to simplify a particular application of the present invention, and is not necessary to the method or system of the present invention.

Figure 2:
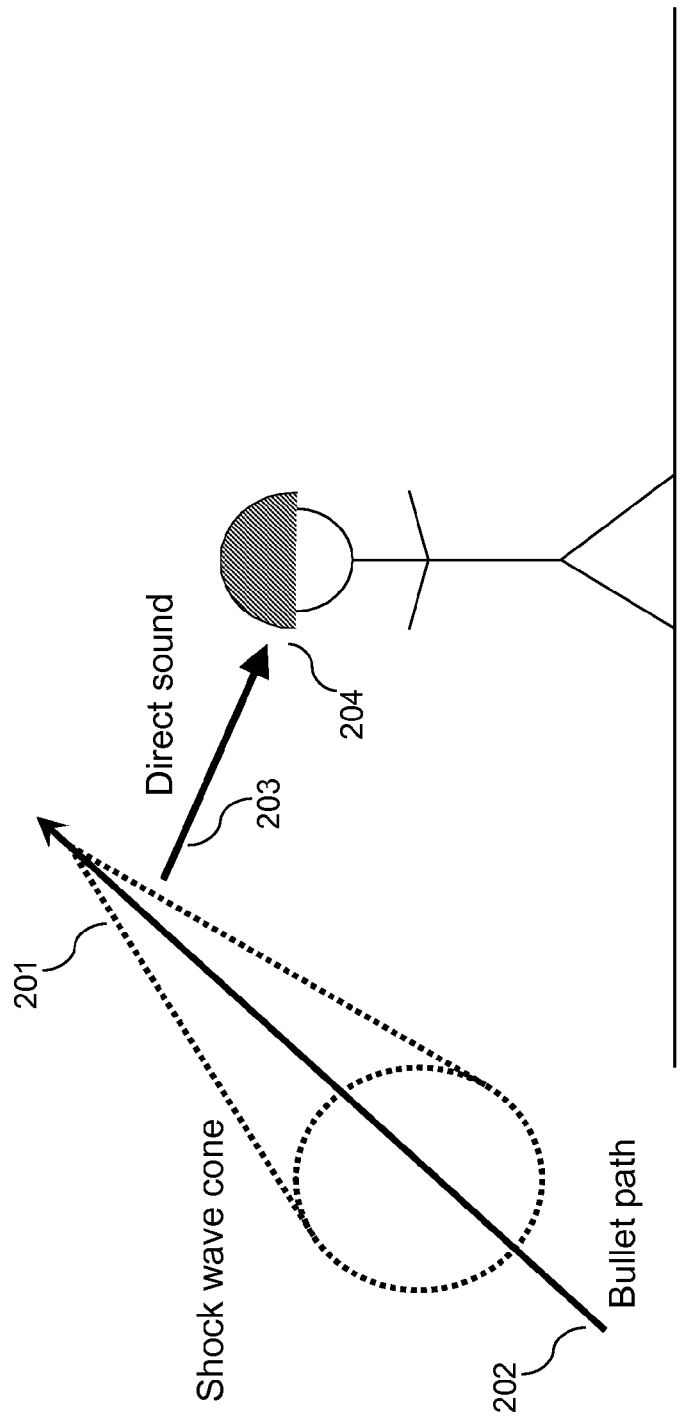
FIG. 2 is a block diagram illustrating an exemplary manner in which a receiver such as a receiver mounted on a Marine's helmet can record the direct sound created by the shock wave as the bullet travels along its path.

As seen in FIG. 2, the shock wave 201 created by a bullet 202 traveling in its trajectory can be sensed by the direct sound 203 it produces, for example, by the sound being received by a sensor 204 such as one or more microphones mounted on a helmet worn by a Marine.

Using software loaded onto a portable device, for example, a device carried by the Marine or located nearby, the angle of the received signal can be estimated, for example, by using a time of arrival algorithm known in the art. See, e.g., A. Fenwick, "Algorithms for position fixing using pulse arrival times," *IEE Proceedings on Radar, Sonar, and Navigation*, Vol. 146, No. 4, p. 208 (1999), which is hereby incorporated by reference herein. As described in Fenwick et al., the azimuth angle returned from the time of arrival algorithm is $\phi$, and the altitude angle is $\psi$. If the assumed angle of the shock wave (calculated from the estimated bullet velocity) is θ, then $\beta=\arctan(\tan(\theta)\cos(\psi))$ and the actual direction of the bullet trajectory is $\alpha_{1,2}=\phi\pm\arctan(\cos(\theta)/\cos(\beta))$. The subscripts 1 and 2 indicate that there are two possible bullet trajectories (i.e., directions of the source of the gunshot) that can lead to the same values of $\phi$ and $\psi$.

Figure 3:
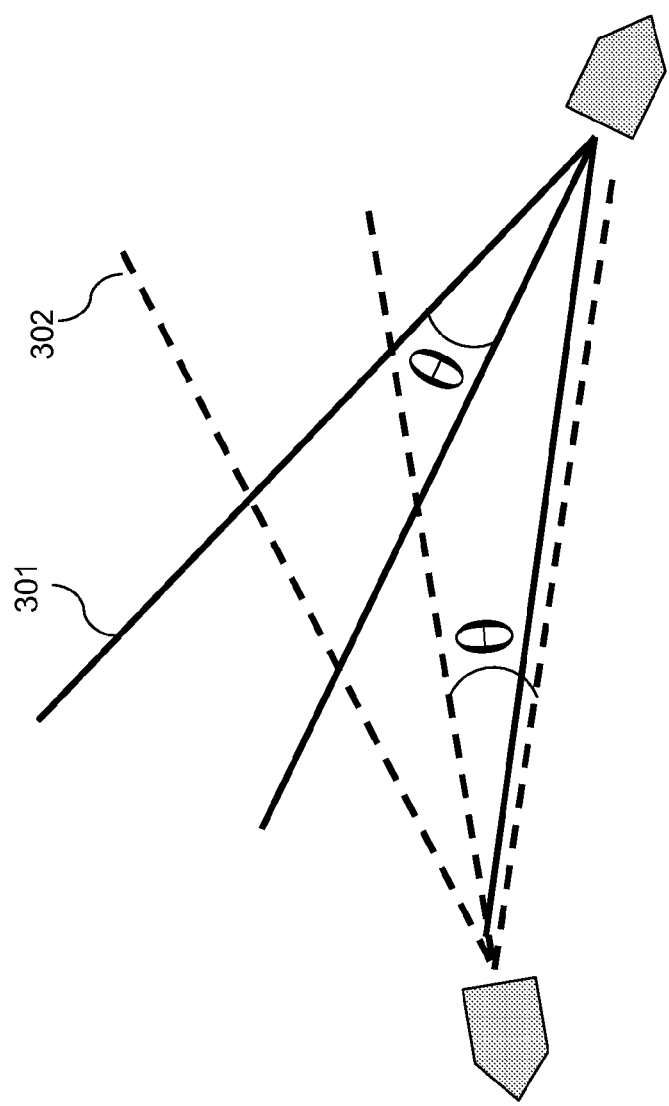
FIG. 3 is a block diagram illustrating the manner in which two trajectories can create shock waves having the same perceived angle θ.
Figure 4:
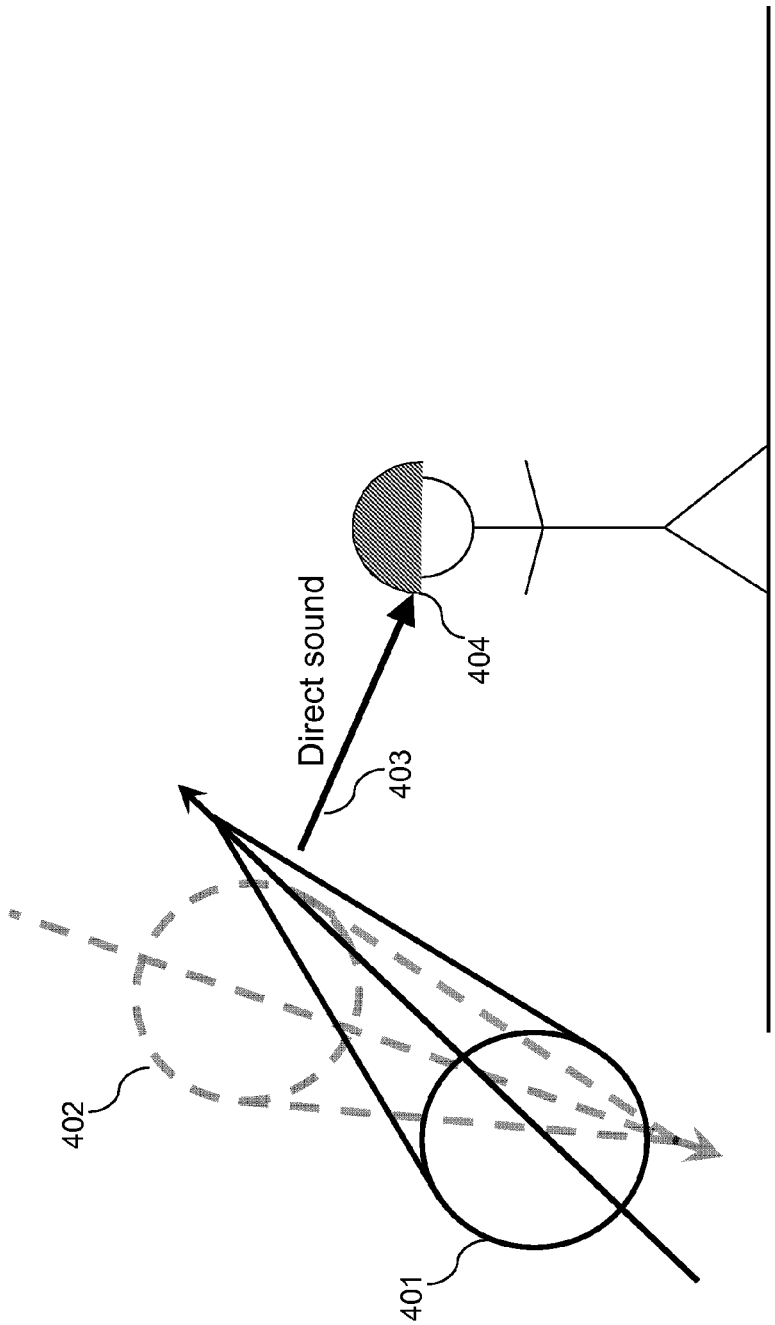
FIG. 4 is a block diagram illustrating the manner in which shock waves created by two different trajectories can create the same recorded direct sound.

There is an ambiguity in the trajectory of the bullet that is estimated in this way. As seen in FIG. 3, more than one trajectory can create the same angle θ. Thus, a bullet traveling in a first direction 301 and another bullet traveling in a second, very different, direction 302 can create the same angle θ and thus the same acoustic shock wave. As seen in FIG. 4, this ambiguity cannot be resolved by sensing the direct sound, since both trajectory 401, caused by a bullet originating from one location, and trajectory 402, caused by a bullet originating from a very different location, create the same direct sound 403 sensed by sensor 404.

The present invention provides a system and method to resolve this ambiguity in bullet trajectory. The present invention utilizes the fact that as the shock wave is propagated through the air, sound is reflected from the ground or other objects and therefore a sensor can receive not only the direct sound created by the shock wave but also these reflected sounds. The ground reflection is created by the shock wave as it travels through the air, and its azimuth angle $\phi_g$ lies between the bullet trajectory direction α and the direct shock wave azimuth angle $\phi$. Therefore, in accordance with the present invention, the ground reflection sound can be used to reliably eliminate one of the two possible trajectories estimated using the direct sound alone and so permit a better estimate of the direction of incoming gunfire. In addition, because the ground reflection always will come from an elevation lower than the direct sound and on the same side of the detector as the direct sound, it is easy to identify and distinguish from other reflected sounds.

Figure 5A:
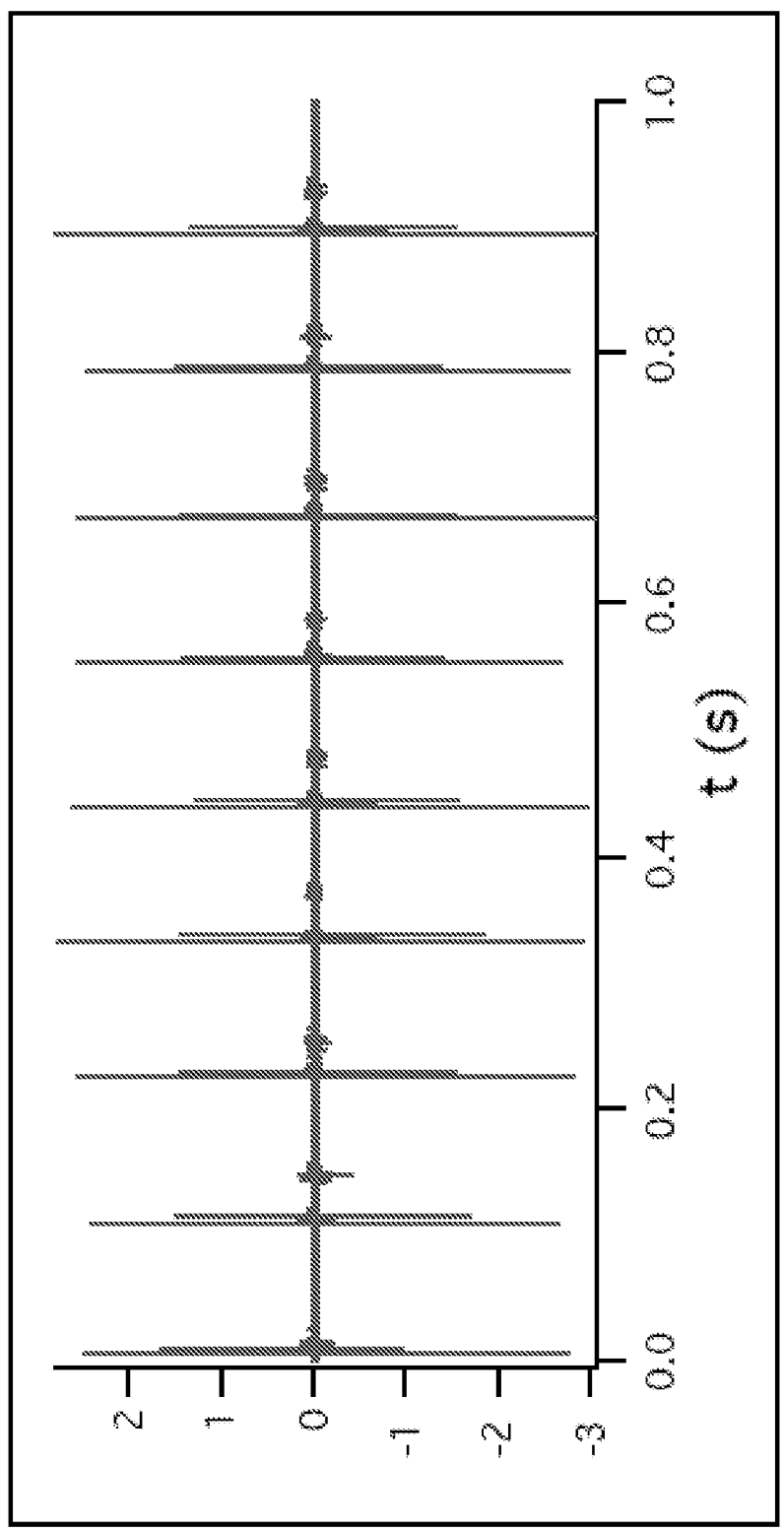
FIG. 5A depicts plots of acoustic energy recorded from multiple gunshots.
Figure 5B:
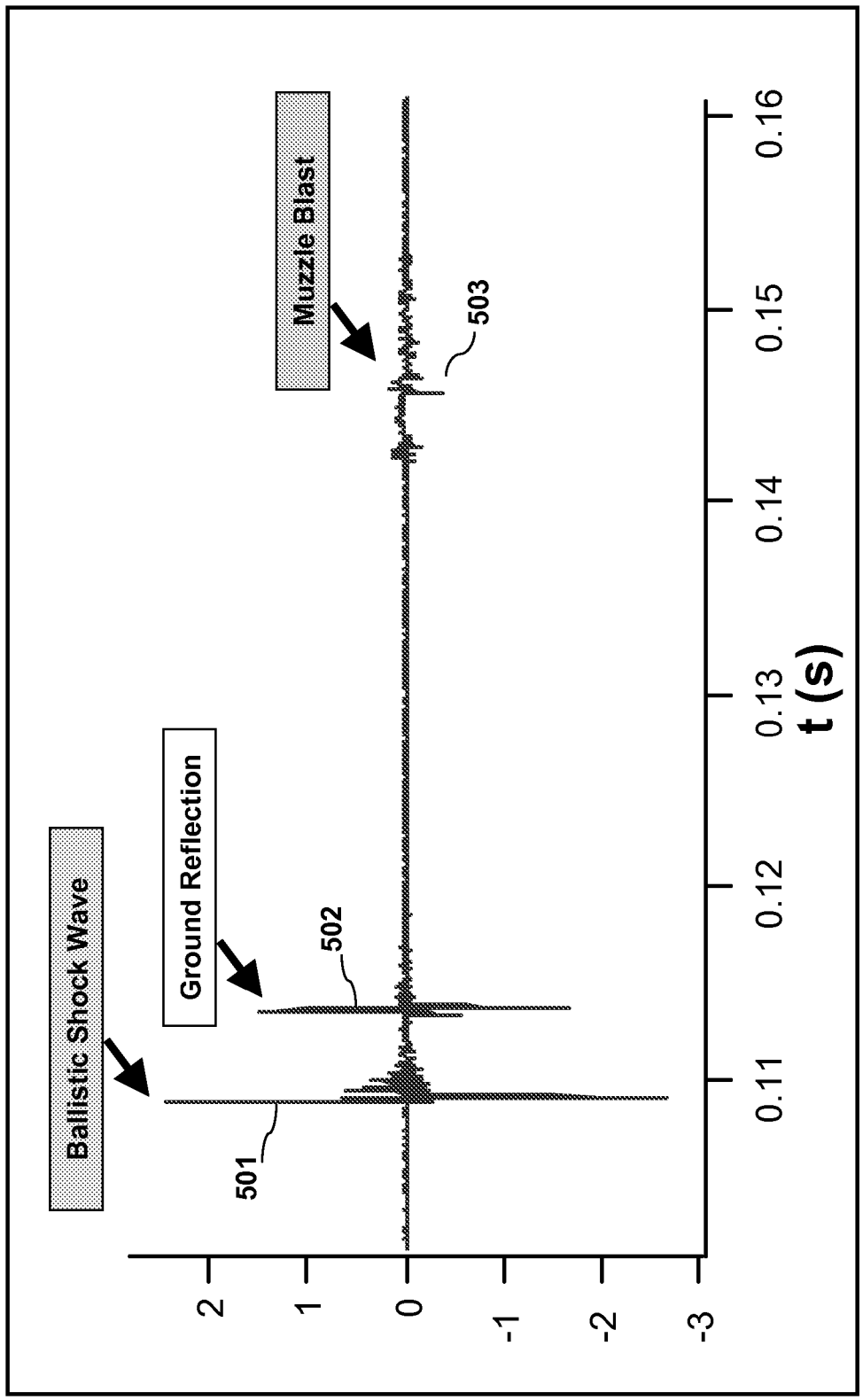
FIG. 5B depicts a plot showing the recorded acoustic energy for an initial acoustic shock wave, a ground reflection, and a muzzle blast from a single shot.

FIGS. 5A and 5B illustrate the presence of the secondary sound produced by the ground reflection. FIG. 5A is a plot of sounds recorded from 9 shots from a .50 caliber machine gun fired at an estimated range of 50 to 70 meters from a series of microphones mounted on a helmet, with the bullets passing within about 10 to 20 feet of the helmet. As seen in FIG. 5A, the time between shots is approximately 0.12 seconds. FIG. 5B is a blow-up of the plot made by the sound recorded for one such shot. As seen in FIG. 5B, the first signal 501 to reach the helmet-mounted sensors was the direct sound from the shock wave created by the bullet. This sound was recorded at just past 0.11 seconds, and its duration was approximately 0.1 ms. The second sound 502, caused by the reflection of the shock wave from the ground was recorded at about 0.115 seconds. A third sound 503, caused by the muzzle blast from the gun, was recorded shortly thereafter, at about 0.145 seconds.

As can be seen from FIGS. 5A and 5B, the time between the detection of the direct shock wave and the detection of the ground reflection (about 0.005 seconds) is much smaller than the time between shots (about 0.12 seconds), and so subsequent shots from the machine gun will not interfere with the detection of the ground reflection. Thus, in accordance with the present invention, the ground reflection can be detected and used to resolve the ambiguity in gunfire direction without interference from the detected sounds from additional gunshots being fired.

Figure 6:
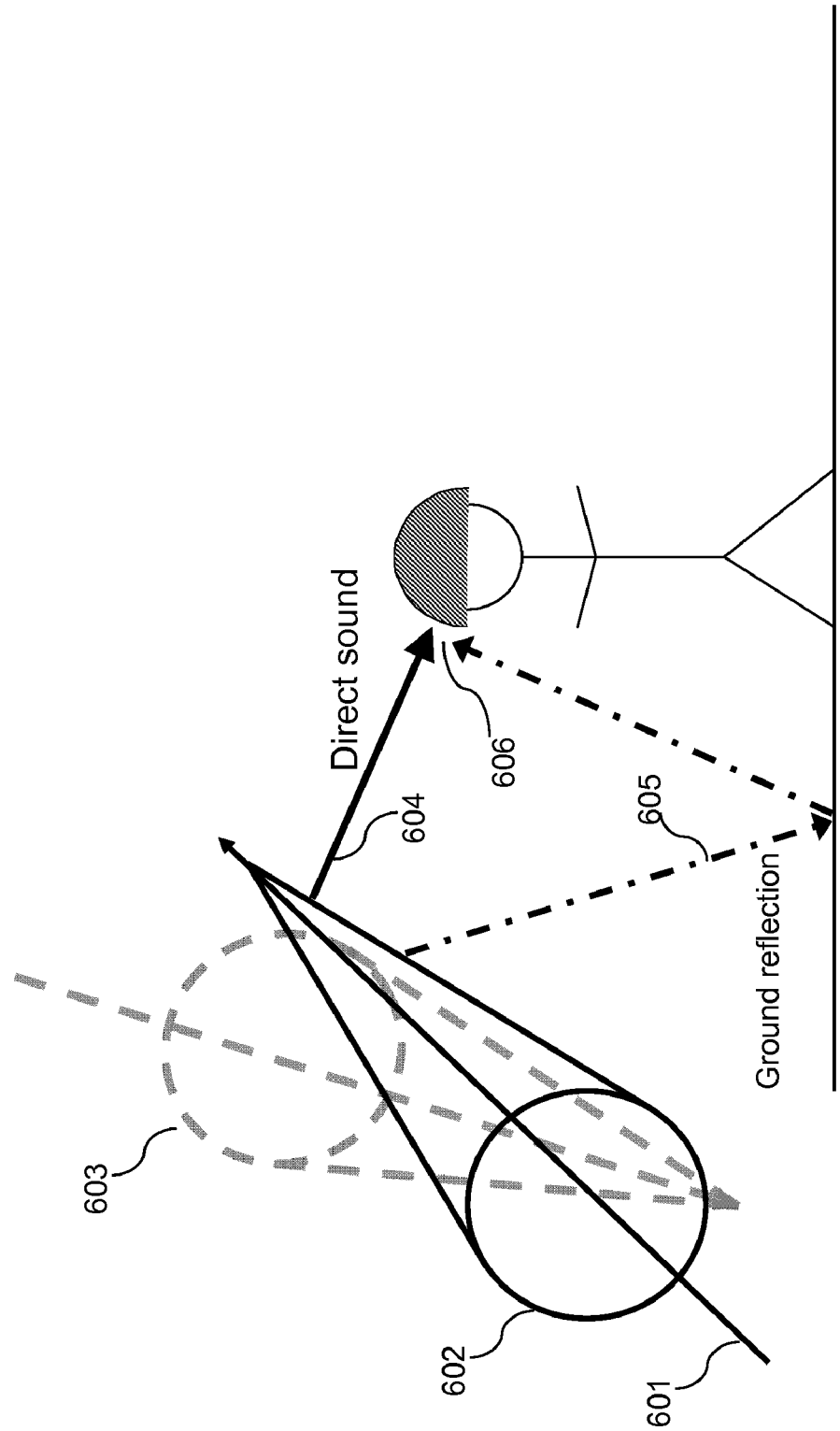
FIG. 6 is a block diagram illustrating an exemplary manner in which a receiver such as a receiver mounted on a Marine's helmet can record both the direct sound created by one of two shock waves representing two different bullet trajectories and the ground reflection of the actual shock wave caused by the bullet traveling along its path.

FIG. 6 illustrates an exemplary embodiment of the present invention. In the embodiment shown in FIG. 6, a bullet having a trajectory 601 from a particular direction creates an acoustic shock wave whose direct sound 604 can be received by a detector comprising one or more microphones, for example, by microphones 606 mounted on the helmet of a Marine standing nearby. An angle associated with this acoustic shock wave, for example, an azimuthal angle of arrival of the sound, can be determined by a processor associated with the detector. However, as described above with respect to FIG. 4, two possible shock waves 602 and 603, representing two different bullet trajectories, can produce the same direct sound 604, and therefore estimating an angle of direction of the bullet from the direct shock wave sound only can result in an ambiguity in the estimated origin of the bullet.

In accordance with the present invention, this ambiguity can be resolved by measuring a reflected sound produced by the shock wave to provide more information regarding the direction of origin of the bullet. Thus, as shown in FIG. 6, in addition to direct sound 604, the shock wave also produces a ground reflection sound 605 which can be received by the microphones 606 on the Marine's helmet, and an angle of arrival of the ground reflection also can be determined by the processor in the same way as for the direct sound. As described above, this ground reflection sound, which is produced by the shock wave as it travels in its true path, will always come from the direction from which the bullet is traveling. In addition, the ground reflection will always come from an elevation direction below that of the direct sound, and so can be distinguished from other reflected sounds such as those reflecting off walls of nearby buildings or other objects. Also, as noted above, the maximum path length difference between the direct shock wave sound and the ground reflection is roughly equal to the height of a person, so the time between reception of the direction sound and the ground reflection sound is approximately 0.006 seconds, less than the time between shots, so that the ground reflection can be readily distinguished from the direct sounds produced by additional bullets.

In addition, in accordance with the present invention, the system can easily be configured to ignore sounds after the direct and the reflected sounds are detected, either by shutting off the microphones so that additional sounds are not recorded or by configuring the software to ignore such additional sounds. In this way the system can avoid confusion from additional shot sounds during a firefight.

An exemplary embodiment of the way in which the ground reflection can be used to resolve ambiguities in the direction of incoming gunfire is described in more detail with respect to FIGS. 7A-7B and 8A-8B.

Figure 7A:
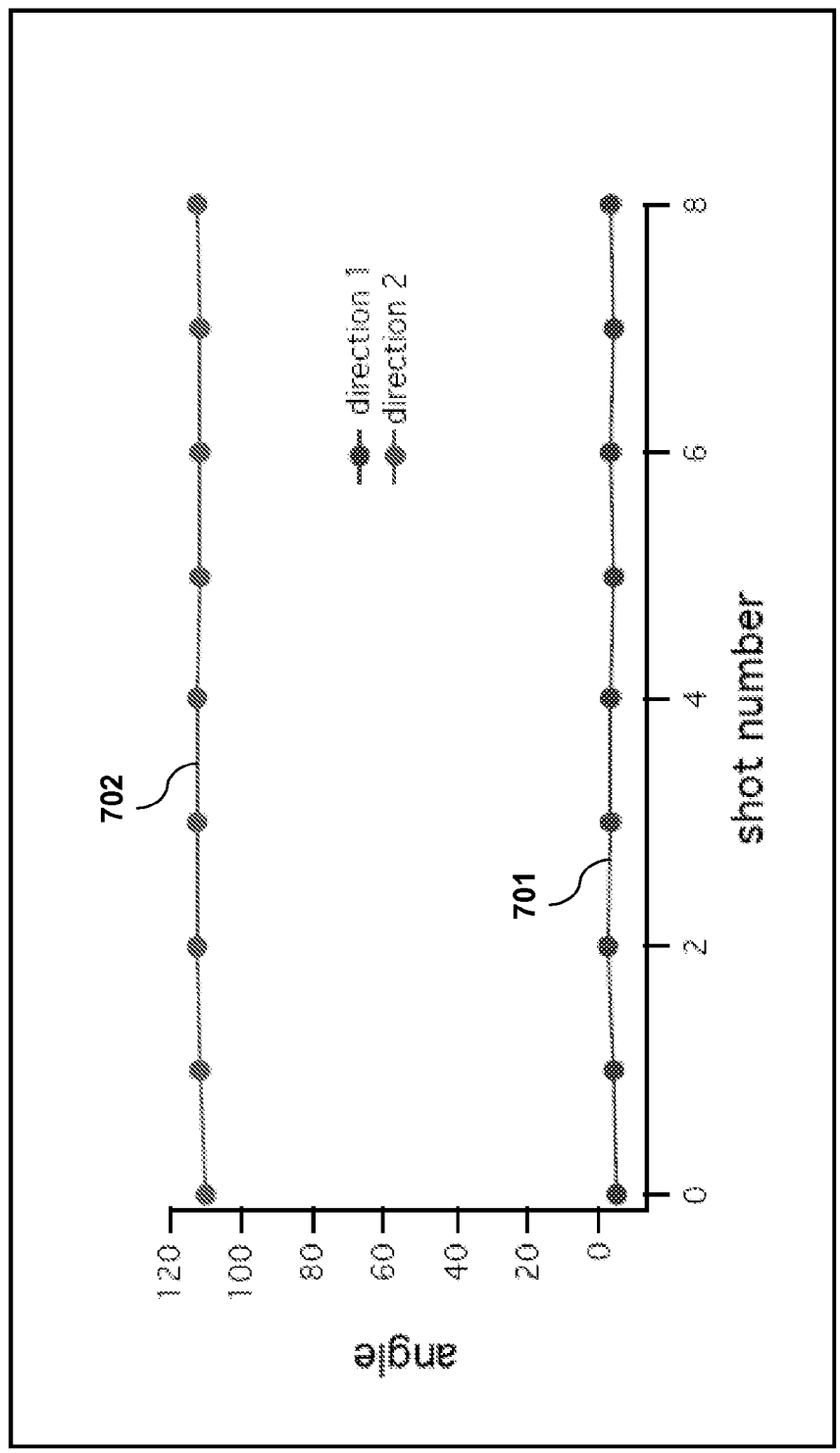
FIG. 7A depicts plots of two different angles of approach estimated using only the recorded direct sound from a shock wave created by a bullet traveling along its path.

FIG. 7A presents a plot of estimated azimuthal angles 701, 702 for a series of nine shots (numbered 0 through 8) fired at an actual incoming azimuthal angle of zero degrees. FIG. 7A shows two possible incoming directions of the shots estimated using only receipt of the direct sound from the acoustic shock wave. As shown in FIG. 7A, one estimated incoming azimuthal direction, shown in plot 701, is approximately −4 degrees, close to the actual incoming direction of zero degrees, while the other estimated incoming direction, shown in plot 702, is very different, at an azimuthal angle of approximately 110 degrees. Obviously, a Marine seeking to locate the source of the incoming gunfire could face significant harm if he chooses the wrong direction in which to direct his return fire or could waste scarce resources if he tries to address both possible directions.

Figure 7B:
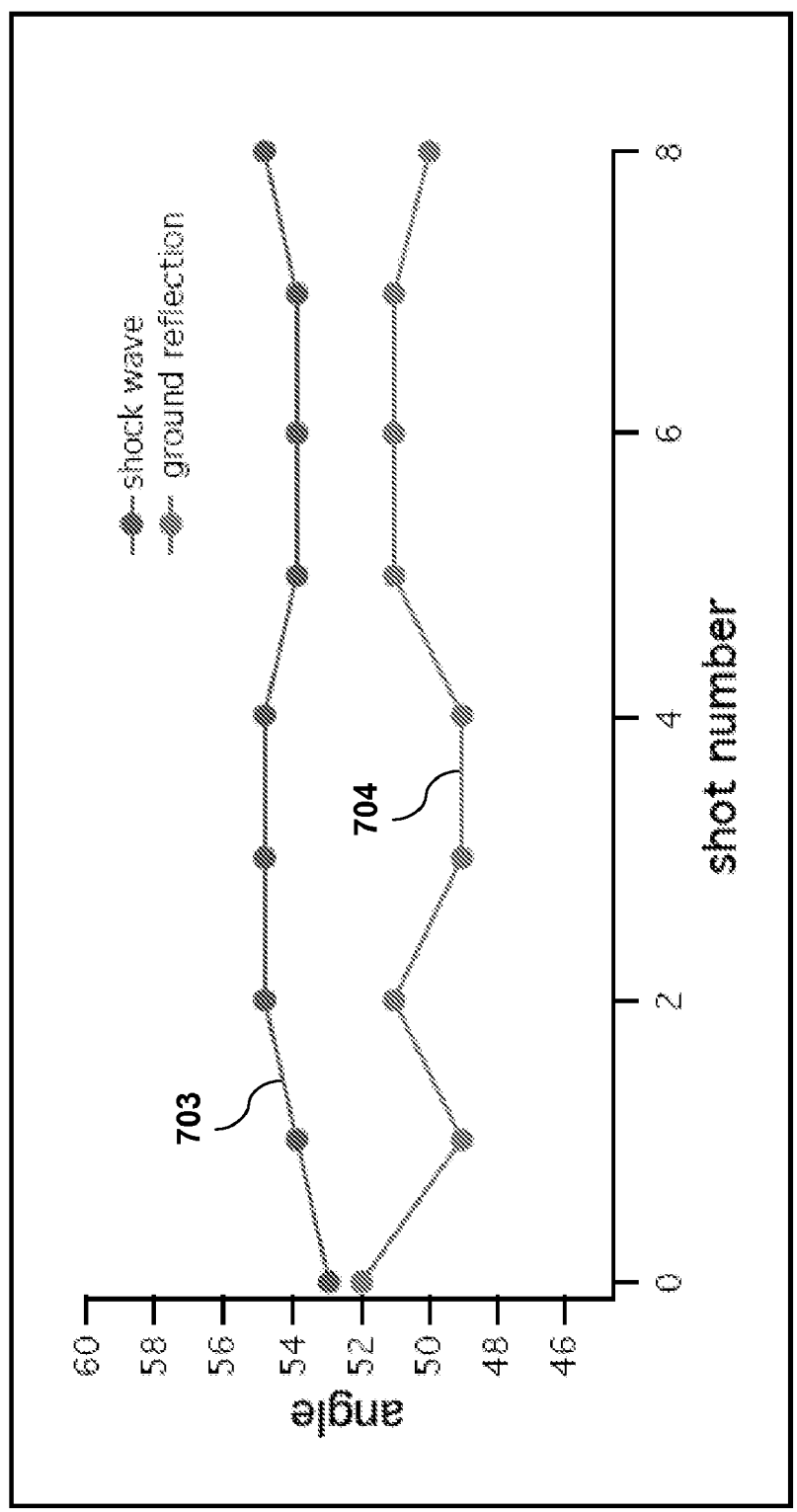
FIG. 7B depicts plots of estimated angles of the shock wave and of the ground reflection created by the bullet traveling along its path, which can be used to resolve the ambiguity in direction of the bullet according to the present invention.

FIG. 7B depicts plots of the estimated azimuthal angles of the detected direct and ground reflection sound from the acoustic shock wave for the nine shots whose estimated directions are shown in FIG. 7A. The estimated azimuthal angle of the direct sound from the shock wave is shown in plot 703, and is estimated to be between approximately 53 and 55 degrees. The estimated azimuthal angle of the ground reflection sound shown in plot 704, on the other hand, is between about 49 degrees (for example, for shot number 3) and 52 degrees (for the shot numbered shot 0).

All of the estimated azimuthal angles for the ground reflection sound shown in FIG. 7B are closer to one of the two estimated azimuthal directions shown in FIG. 7A. That is, all of the estimated azimuthal angles 703 for the ground reflection, which range from 48 to 52, are closer to −4 degrees in the first estimated direction 701 (a maximum difference of about 56 degrees) than to 115 degrees in the second estimated direction 702 (a minimum difference of about 63 degrees). In accordance with the present invention, because the ground reflection is always going to lie between the direct shock wave azimuth angle and the bullet trajectory direction, the fact that the azimuthal angle of the ground reflection is closer to one of two possible directions than the other can confirm which one of the two possible estimated directions is correct and so resolve the ambiguity between the two.

Figure 8A:
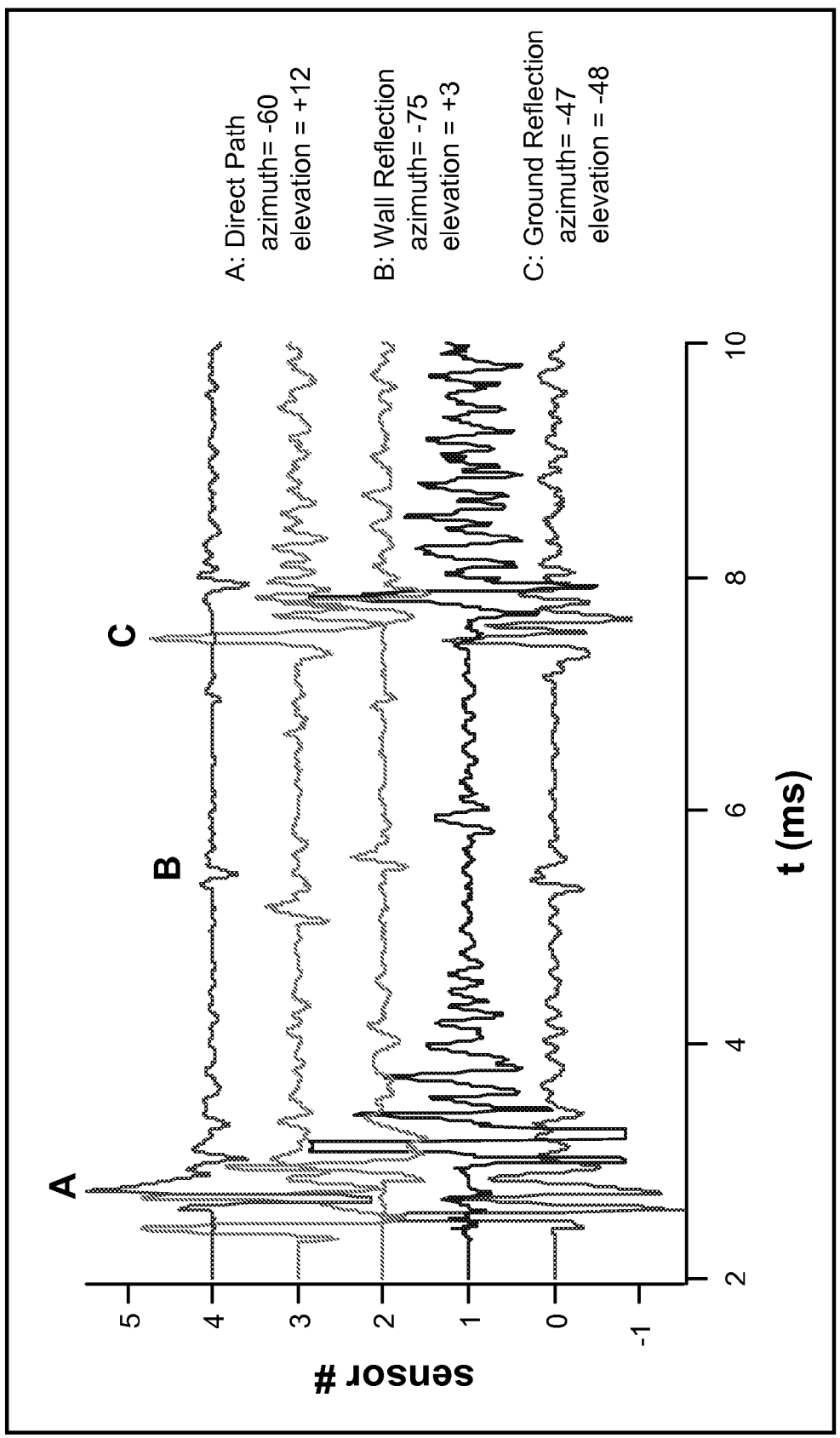
FIG. 8A depicts plots of the recorded sounds created by a bullet in an experiment testing the method of the present invention.
Figure 8B:
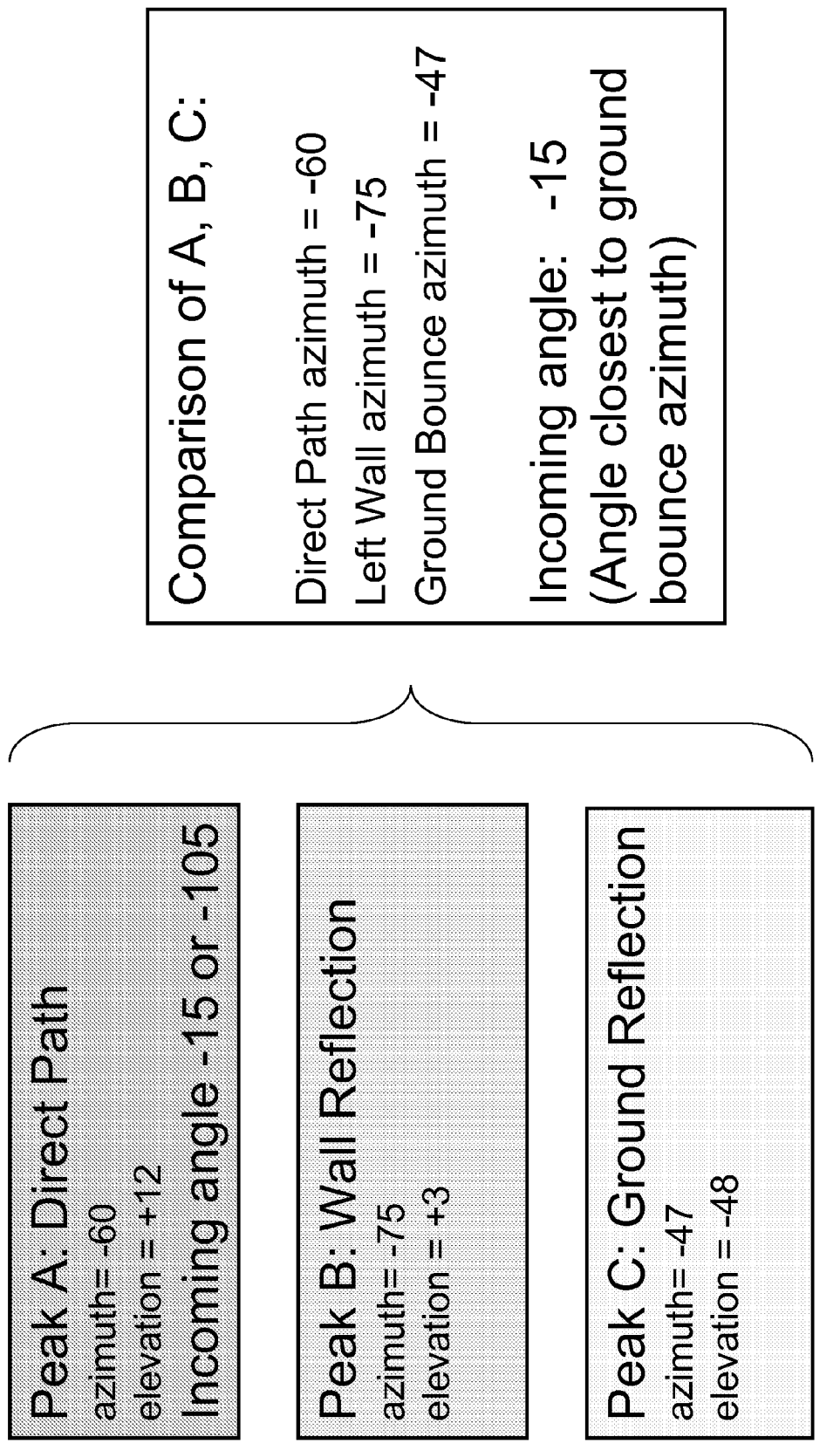
FIG. 8B illustrates the results of the experiment and the manner in which the recorded sounds can be used to estimate the direction of the source of the bullet in accordance with the present invention.

FIGS. 8A and 8B provide further illustration of an exemplary manner in which the ground reflection of the acoustic shock wave can be used to determine a direction of incoming gunfire.

In another test of the method for detecting a direction of incoming gunfire according to the present invention, an M14 rifle was fired at a distance of 200 meters and an incoming angle of 0 degrees from a detector comprising multiple sensors mounted on a helmet, the helmet being located between two walls to provide an additional reflection.

The acoustic shock wave from the shot from the M14 rifle produced three distinct signals recorded by the sensors at three different times. FIG. 8A depicts a plot of these signals, showing three distinct peaks, labeled A, B, and C. Software associated with the sensors receiving these signals determined an approximate azimuthal angle and elevation angle for each signal; in accordance with the invention, this information can then be used to resolve the ambiguity between two possible directions of the incoming shot.

As seen in FIG. 8A, peak A occurs at approximately 2.5 ms. Because this is the first signal caused by the acoustic shock wave to be received by the sensor, it could be determined that this signal corresponds to the sound of the acoustic shock wave received via a direct path. Software associated with the sensors determined that the azimuthal angle of this signal was approximately −60 degrees and the elevation angle was approximately +12 degrees. The second signal was recorded by the sensors at approximately 5 ms and is shown by peak B in FIG. 8A. This signal corresponded to a sound emanating from a source having an azimuthal angle of approximately −75 degrees and an elevation of approximately +3 degrees and so it can be concluded that this signal corresponds to the sound of the acoustic shock wave that bounced off a wall to the left of the helmet. The third signal, received at just before 8 ms, is shown by peak C. This third signal was received at an azimuthal angle of approximately −47 degrees and an elevation of approximately −48 degrees. Because of this low elevation angle, it can be concluded that this third signal corresponds to the sound of the acoustic shock wave that bounced off the ground.

FIG. 8B further illustrates the analysis that can be performed to determine an incoming angle of the gunshot. As seen in FIG. 8B, the signal shown by Peak A corresponding to the direct path sound from the acoustic shock wave was received at an azimuthal angle of −60 degrees and an elevation of +12 degrees. Based on this information, the direction finding software associated with the detector estimated the incoming angle of the acoustic shock wave to be either −15 degrees or −105 degrees. A comparison of the azimuth values for the direct sound, the wall bounce, and the ground reflection shows that the absolute value of the difference between the azimuthal direction of the ground reflection, −47 degrees, and the first estimated direction, −15 degrees, is only 32 degrees, which is less than the 58 degree difference between the ground reflection azimuthal direction and the second estimated direction. As described above, in accordance with the present invention, because the ground reflection emanates from the acoustic shock wave as it travels through the air, the azimuth angle of the ground reflection will lie between the azimuth angle of the direct shock wave sound and the bullet trajectory direction. Thus, based on the comparison of the azimuthal angles of the ground reflection C and the direct sound A, it can be determined that the estimated angle of −15 degrees is closer to the true direction from which the acoustic shock wave—and therefore the gunshot—originates. This comports with the actual direction of the incoming shot, which as noted above, is 0 degrees.

Figure 9B:
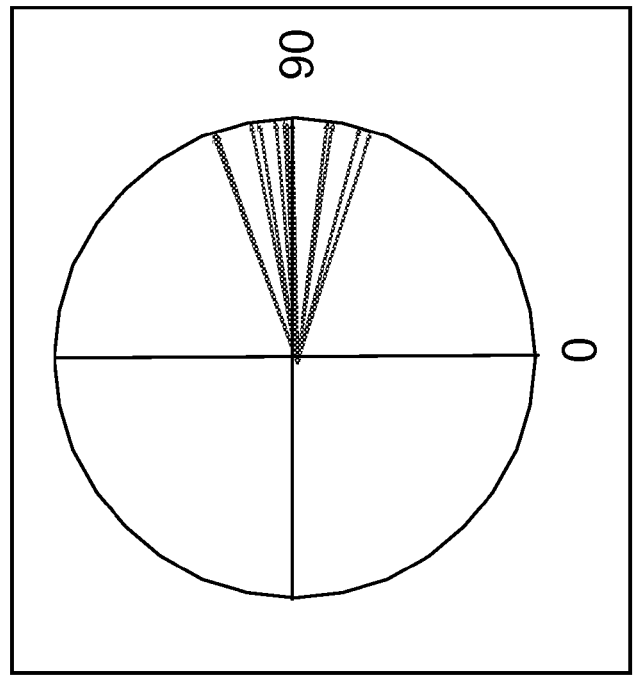
FIGS. 9A and 9B show exemplary plots of the direction of incoming gunshots as estimated according to the present invention when the actual incoming direction is 0 degrees (FIG. 9A) and 90 degrees (FIG. 9B) from the detector.
Figure 9A:
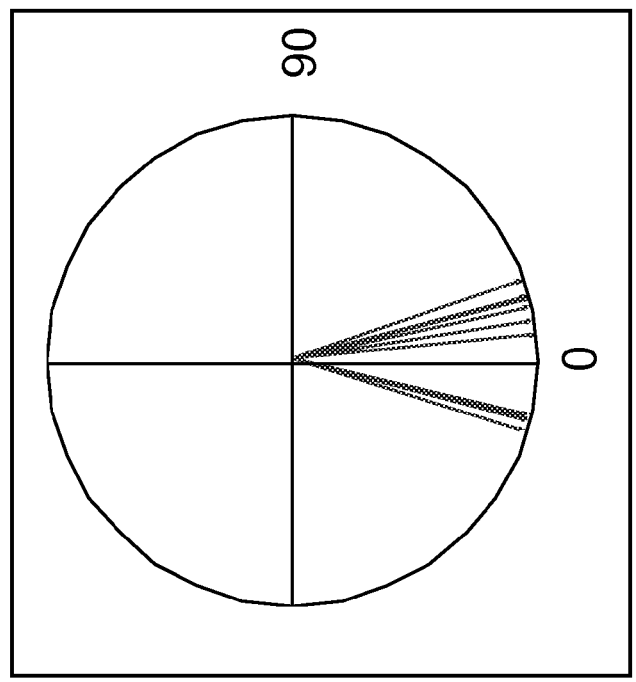

Thus the method of the present invention can provide a good estimate of the incoming direction of a gunshot which can be very useful to Marines and soldiers in the field. FIGS. 9A and 9B show an exemplary range of accuracy of the incoming direction estimated according to the present invention compared to the actual incoming direction. In FIG. 9A, the actual incoming direction was 0 degrees, and as seen in FIG. 9A, the estimated directions all are within a small range of that direction. Similarly, in FIG. 9B, the actual incoming direction was 90 degrees, and again, the incoming directions estimated according to the invention all point in that general direction. Thus, the method of the present invention allows a Marine to eliminate one of two possible directions quickly and easily and have an estimate of the direction of the incoming gunfire so that resources can be most successfully deployed against the source of the gunfire.

In some embodiments, a detector according to the present invention can also provide an indication of the bullet's direction to the user. In some embodiments, this would take the form of an audible notification, such as calling out "one o'clock" using the well-known standard clock-based directional notation or can be one or more tones configured to convey a direction. Because the signal processing for this detector is simple, a fast audio feedback might give the user time to react before the muzzle blast is heard.

In other embodiments, one or more aspects of the present invention can also be used with existing sniper detection systems, for example, in an add-on algorithm, in order to improve the direction-finding capabilities of such systems.

In other embodiments, some of the processing can be done by analog circuits to give a shorter computation time and thus provide faster feedback information to a Marine.

In addition, in some embodiments, if an ambiguity in the direction of the bullet source remains after processing the ground reflection or other reflected signals, the default action of the detector can be to not report any direction. In such embodiments, the detector does not need to give a result every time, but as can be appreciated, if there is any doubt, it should not give a wrong direction.

It should be noted that aspects of a system and method for finding a direction of incoming gunfire as described herein can be accomplished by executing one or more sequences of one or more computer-readable instructions read into a memory of one or more computers from volatile or non-volatile computer-readable media capable of storing and/or transferring computer programs or computer-readable instructions for execution by one or more computers. Volatile computer readable media that can be used can include a compact disk, hard disk, floppy disk, tape, magneto-optical disk, PROM (EPROM, EEPROM, flash EPROM), DRAM, SRAM, SDRAM, or any other magnetic medium; punch card, paper tape, or any other physical medium. Non-volatile media can include a memory such as a dynamic memory in a computer. In addition, computer readable media that can be used to store and/or transmit instructions for carrying out methods described herein can include non-physical media such as an electromagnetic carrier wave, acoustic wave, or light wave such as those generated during radio wave and infrared data communications.

Although particular embodiments, aspects, and features have been described and illustrated, it should be noted that the invention described herein is not limited to only those embodiments, aspects, and features. It should be readily appreciated that modifications may be made by persons skilled in the art, and the present application contemplates any and all modifications within the spirit and scope of the underlying invention described and claimed herein

What is claimed is:

1. A computer-implemented method for estimating a trajectory of an incoming bullet, comprising:
receiving data indicative of a first auditory signal associated with an acoustic shock wave produced by the bullet traveling through the air, the first auditory signal being received by a receiver on a direct path from the acoustic shock wave to the sensor;
determining a direction of arrival of the first auditory signal;
determining first and second estimated trajectories of the bullet based on the direction of the first auditory signal;
receiving data indicative of a second auditory signal associated with the acoustic shock wave produced by the bullet, the second auditory signal being received by the receiver on a reflected path from the acoustic shock wave to the sensor;
determining a direction of arrival of the second auditory signal;
making a first comparison comparing the direction of arrival of the second auditory signal to the direction of arrival of the first auditory signal;
making a second comparison comparing the direction of arrival of the second auditory signal to the first estimated trajectory;
making a third comparison comparing the direction of arrival of the second auditory signal to the second estimated trajectory; and
identifying one of the first and second estimated trajectories of the bullet as a more correct estimated trajectory as a result of the first, second, and third comparisons.

2. The method according to claim 1, wherein the reflected path of the second auditory signal comprises a ground reflection.

3. The method according to claim 1, further comprising:
receiving information of an estimated angle of the acoustic shock wave; and
determining at least one of the first and the second estimated trajectory of the bullet based on the direction of arrival of the first auditory signal and the estimated angle of the acoustic shock wave.

4. The method according to claim 1, wherein the direction of arrival of the first auditory signal comprises an azimuth angle $\phi$ and an elevation angle $\psi$ and the estimated angle of the acoustic shock wave comprises an angle $\theta$; and
further wherein the first and second estimated trajectories $\alpha_{1,2}$ are estimated as $\alpha_{1,2}=\phi\pm\arctan(\cos(\theta)/\cos(\beta))$, where $\beta=\arctan(\tan(\theta)\cos(\psi))$.

5. The method according to claim 1, wherein the direction of arrival of the first auditory signal comprises an azimuth angle and an elevation angle.

6. The method according to claim 5, wherein the direction of arrival of the second auditory signal comprises an azimuth angle and an elevation angle.

7. The method according to claim 6, further comprising
determining an azimuth angle of each of the first and second estimated trajectories;
comparing the azimuthal angle of the second auditory signal to the anzimuth angle of each of the first and second estimated trajectories; and
identifying the more correct estimated trajectory based on the results of the comparison, wherein the azimuth angle of the second auditory signal lies between the azimuth angle of the first auditory signal and the azimuth angle of the more correct estimated trajectory.

8. The method according to claim 1, further comprising:
receiving data corresponding to a plurality of second auditory signals;
determining direction of arrival of each of the plurality of second auditory signals, the direction of arrival including an azimuth angle and an elevation angle for each of the plurality of second auditory signals; and comparing the direction of arrival of a selected one of the plurality of second auditory signals to the first and second estimated trajectories to identify the more correct estimated trajectory, the selected second auditory signal being selected based on at least one of its azimuth angle and its elevation angle.

9. The method according to claim 1, further comprising providing a notification of the more correct estimated trajectory to a user.

10. The method according to claim 9, wherein the notification comprises an audible notification.

11. The method according to claim 9, wherein the notification comprises a notification of a direction associated with the more correct estimated trajectory.

12. A system for estimating a trajectory of an incoming bullet, comprising:
a plurality of sensors configured to receive auditory signals associated with an acoustic shock wave produced by the bullet and further configured to convert the auditory signals to data indicative of the received signal; and
a processor operatively coupled to the plurality of sensors, the processor being configured to receive and analyze the data indicative of the received auditory signals;
wherein the sensors receive a first and a second auditory signal associated with the acoustic shock wave, the first auditory signal being received on a direct path from the acoustic shock wave to the sensors and the second auditory signal being received on a reflected path from the acoustic shock wave to the sensors;
wherein the processor determines a direction of arrival of the first auditory signal and a first and second estimated trajectory of the incoming bullet based on the direction of arrival of the first auditory signal;
wherein the processor determines a direction of arrival of the second auditory signal;
wherein the processor makes a first comparison comparing the direction of arrival of the second auditory signal to the direction of arrival of the first auditory signal, makes a second comparison comparing the direction of arrival of the second auditory signal to the first estimated trajectory, and makes a third comparison comparing the direction of arrival of the second auditory signal to the second estimated trajectory; and
wherein the processor identifies one of the first and second estimated trajectories as a more correct estimated trajectory based on the results of the first, second, and third comparisons.

13. The system according to claim 12, wherein the reflected path of the second auditory signal comprises a ground reflection.

14. The system according to claim 12, wherein the direction of arrival of the first and second auditory signals comprises an azimuth angle; and
further wherein the processor compares an azimuth angle of each of the first and second estimated trajectories to the azimuth angle of the second auditory signal to identify which of the first and second estimated trajectories is the more correct estimated trajectory, wherein the azimuth angle of the second auditory signal lies between the azimuth angle of arrival of the first auditory signal and the more correct estimated trajectory.

15. The system according to claim 12, further wherein the processor is configured to receive data corresponding to a plurality of second auditory signals, determine an azimuth angle and an elevation angle of each of the plurality of second auditory signals, and compare the azimuth angle of a selected one of the plurality of second auditory signals to the first and second estimated trajectories to identify the more correct estimated trajectory, the selected second auditory signal being selected based on at least one of its azimuth angle and its elevation angle.

16. The system according to claim 12, wherein the detector comprises at least three sensors.

17. The system according to claim 12, wherein the detector is configured to be included in equipment worn by a person.

18. The system according to claim 17, wherein the detector is configured to be included in a helmet.

19. The system according to claim 12, wherein the detector is configured to be included in equipment mounted on a vehicle.

20. A computer program product including a computer storage medium comprising one of volatile media and non-volatile media and a computer program code mechanism embedded in the computer storage medium for estimating a trajectory of an incoming bullet, comprising:
a computer code module configured to receive data of a first auditory signal associated with an acoustic shock wave produced by the bullet, the first auditory signal being received by a receiver on a direct path from the acoustic shock wave to the sensor;
a computer code module configured to determine a first and a second estimated trajectory of the bullet based on information of the first auditory signal;
a computer code module configured to receive data indicative of a second auditory signal associated with the acoustic shock wave produced by the bullet, the second auditory signal being received by the receiver on a reflected path from the acoustic shock wave to the sensor;
a computer code module configured to determine a direction of arrival of the second auditory signal;
a computer code module configured to make a first comparison comparing the direction of arrival of the second auditory signal to the direction of arrival of the first auditory signal;
a computer code module configured to make a second comparison comparing the direction of arrival of the second auditory signal to the first estimated trajectory;
a computer code module configured to make a third comparison comparing the direction of arrival of the second auditory signal to the second estimated trajectory; and
a computer code module configured to identify which one of the first and second estimated trajectories is a more correct estimated trajectory based on the results of the first, second, and third comparisons.

* * * * *